(12) United States Patent
Mowry et al.

(10) Patent No.: US 8,146,988 B2
(45) Date of Patent: Apr. 3, 2012

(54) RESETTABLE SEAT WITH ENERGY ABSORBER

(75) Inventors: Gregory Alan Mowry, Phoenix, AZ (US); Marvin Kent Richards, Gilbert, AZ (US); Gregory Brian Grace, Mesa, AZ (US); Curtis Phillip Parsons, Gilbert, AZ (US)

(73) Assignee: BAE Systems Aerospace & Defense Group Inc., Phoenix, AZ (US)

( * ) Notice: Subject to any disclaimer, the term of this patent is extended or adjusted under 35 U.S.C. 154(b) by 232 days.

(21) Appl. No.: 12/430,981

(22) Filed: Apr. 28, 2009

(65) Prior Publication Data
US 2010/0270836 A1    Oct. 28, 2010

(51) Int. Cl.
*B60N 2/42* (2006.01)
(52) U.S. Cl. .................................................. 297/216.1
(58) Field of Classification Search ............... 297/216.1, 297/216.16, 216.17, 216.18, 216.19
See application file for complete search history.

(56) References Cited

U.S. PATENT DOCUMENTS

| | | | | |
|---|---|---|---|---|
| 2,953,189 | A * | 9/1960 | Barash | 297/216.17 |
| 3,087,584 | A * | 4/1963 | Jackson et al. | 188/372 |
| 3,968,863 | A * | 7/1976 | Reilly | 188/372 |
| 5,309,861 | A | 5/1994 | Mardikian | |
| 5,324,095 | A | 6/1994 | Yamauchi | |
| 5,642,916 | A * | 7/1997 | Dybro et al. | 297/216.18 |
| 6,152,526 | A * | 11/2000 | Persson et al. | 297/216.13 |
| 6,378,939 | B1 * | 4/2002 | Knoll et al. | 297/216.1 |
| 7,293,830 | B2 | 11/2007 | Marotta et al. | |
| 7,484,799 | B2 | 2/2009 | Meyer | |
| 2005/0127730 | A1 | 6/2005 | Bischoff | |

OTHER PUBLICATIONS

Description of Prior Art Seat, attached as Exhibit A.

* cited by examiner

*Primary Examiner* — David Dunn
*Assistant Examiner* — Philip Gabler
(74) *Attorney, Agent, or Firm* — Kane Kessler, P.C.; Paul E. Szabo (57) ABSTRACT

A vehicle seat that strokes during an energy absorption process is able to reset. The seat can therefore stroke again, in the same stroking volume, for example during a secondary ground impact after a mine blast. An energy absorber associated with the seat is operative to absorb energy once during the first stroke and is also operative to absorb energy a second time when the seat strokes a second time.

9 Claims, 9 Drawing Sheets

RESETTABLE SEAT WITH ENERGY ABSORBER

BACKGROUND

1. Technical Field

This invention relates to a seat for a vehicle and, in particular, to a device that absorbs energy of sudden movement of a seat, such as vertical movement.

2. Description of the Prior Art

Some vehicles are subject to sudden vertical force, such as, for example, the force of a land mine blast under a military vehicle. This force can lift the vehicle suddenly off the ground, possibly causing injury to an occupant seated in the vehicle. Thereafter, when the vehicle drops back to the ground, the occupant again experiences strong forces that can cause injury. It is desirable to provide a vehicle seat that can absorb some of this energy, and that can do so both in the lifting event and in the dropping event, not merely one time.

DETAILED DESCRIPTION

Figure 1:
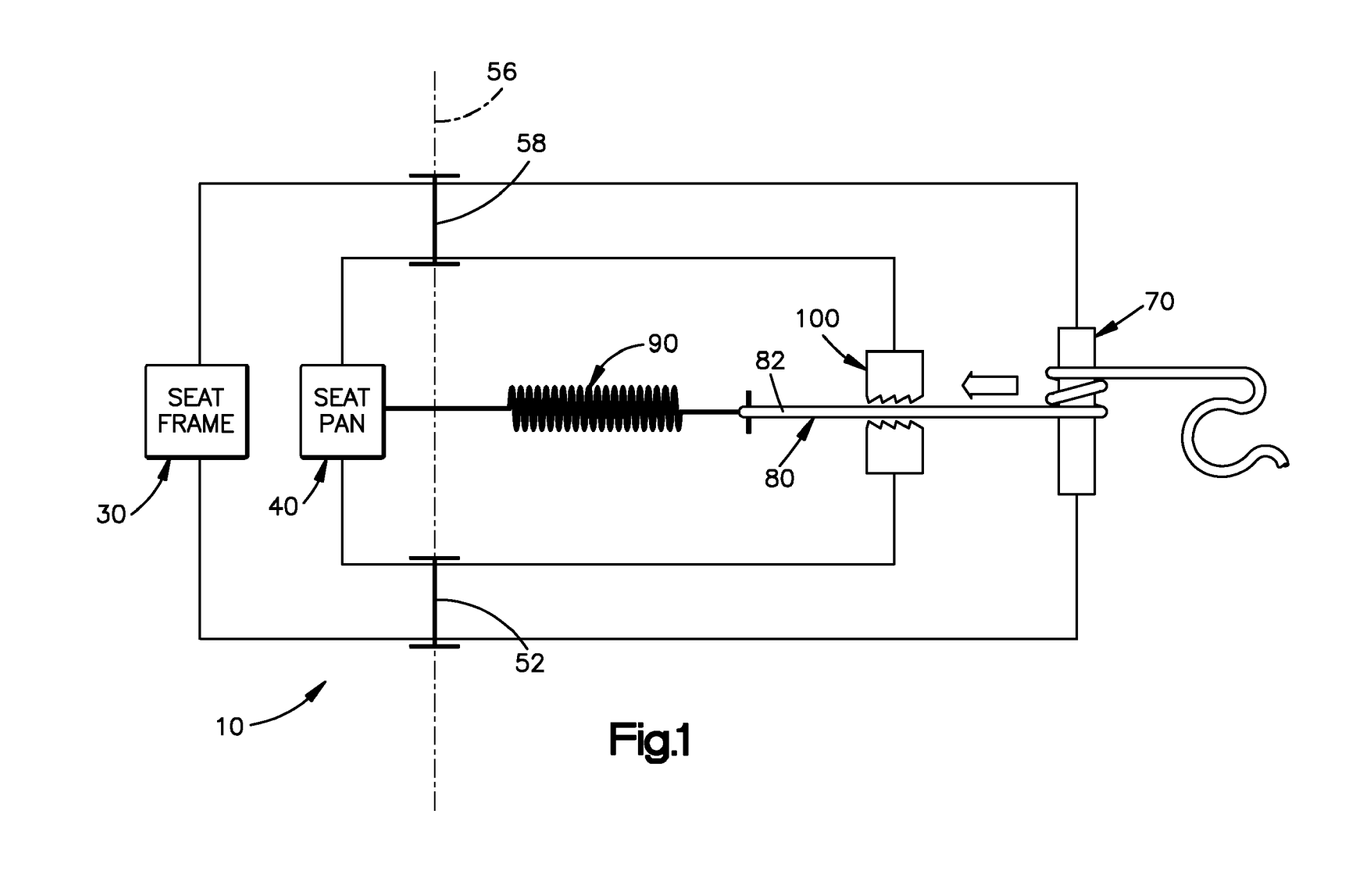
FIG. 1 is a schematic illustration of parts of an energy absorber that is a first embodiment of the present invention.
Figure 2:
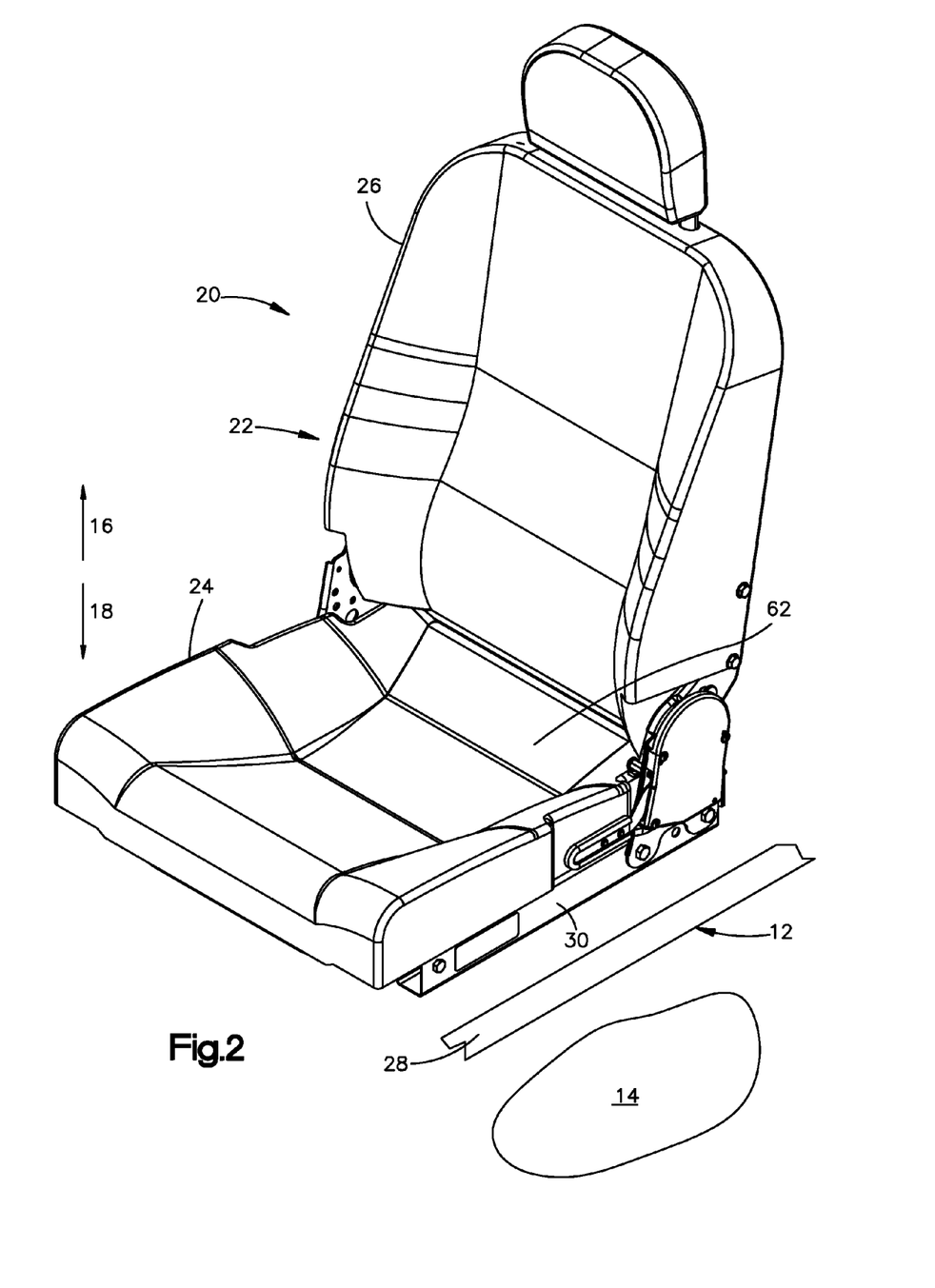
FIG. 2 is a perspective view of a vehicle seat assembly that includes the energy absorber of FIG. 1.
Figure 3:
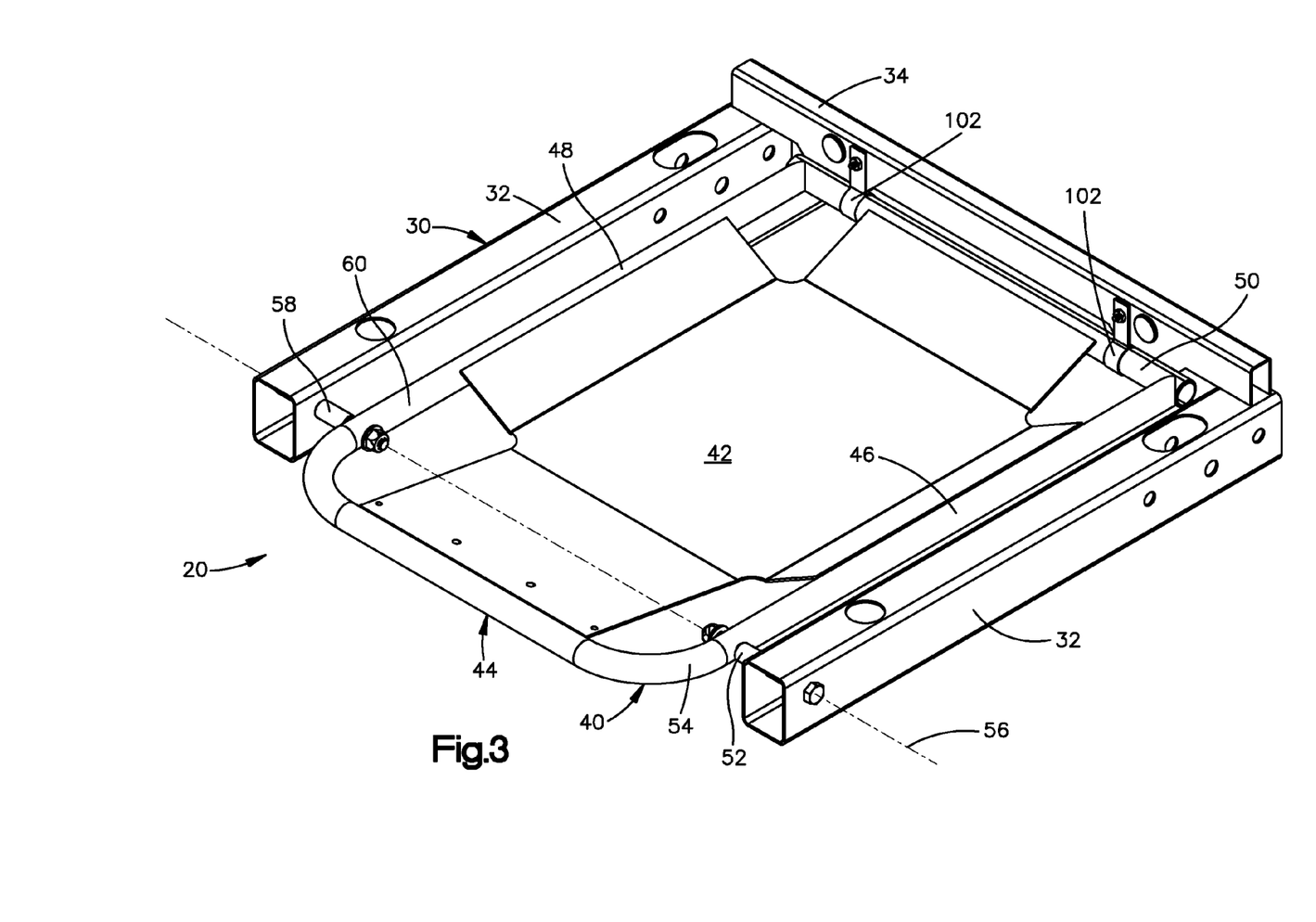
FIG. 3 is a bottom perspective view of the seat assembly of FIG. 2.
Figure 4:
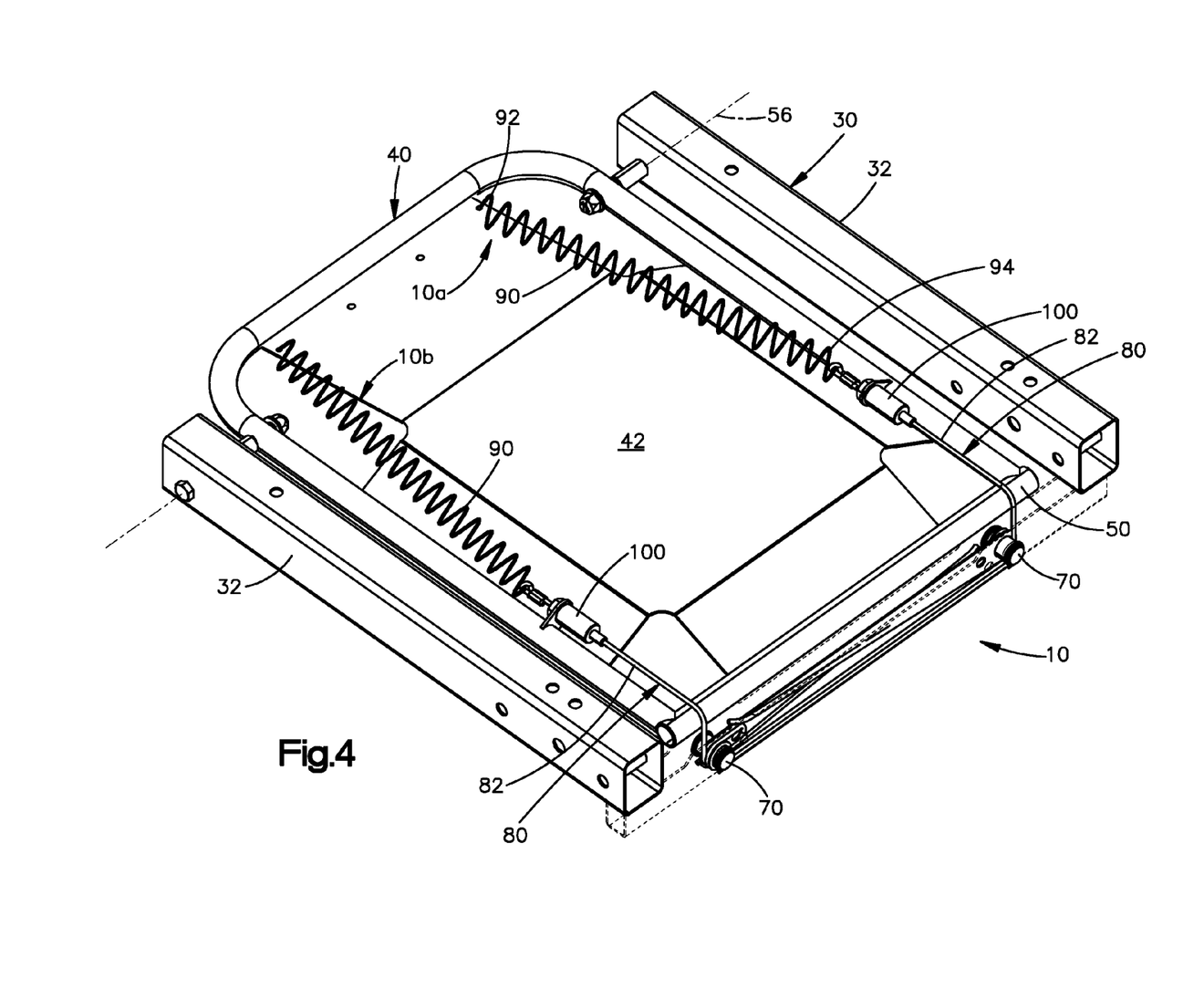
FIG. 4 is a view similar to FIG. 3 but with parts removed to show more clearly the energy absorber.

FIG. 1 illustrates schematically an energy absorber 10 in accordance with the invention. The particular energy absorber 10 that is shown and described herein is one exemplary embodiment of the invention; there are numerous other designs that can incorporate the invention and that are intended to be covered by the appended claims. The energy absorber 10 includes a mandrel 70, a wire 80, a spring 90, and a gripper 100, all described below in detail. The energy absorber 10 is incorporated in a seat assembly 20 (FIGS. 2-4) of a vehicle shown schematically and partially at 12. In FIG. 2, the vehicle 12 is shown resting on a ground surface illustrated schematically at 14. The vehicle 12 may be a military vehicle that can encounter sudden force from underneath, such as a mine blast; the invention is applicable to such vehicles and the following description is thus tailored, although the invention could be utilized in environments other than military. An energy absorber in accordance with the invention may also be used in conjunction with other types of vehicles 12 and for absorbing force arising in other circumstances.

An upward direction relative to the ground surface 14 is indicated by the arrow 16. The vehicle 12 may move in the upward direction 16, off the ground surface, for example if the vehicle experiences a land mine blast underneath the vehicle. A downward direction 18 relative to the ground surface 14 is indicated by the arrow. The vehicle 12 moves in the downward direction 18, to contact the ground surface 14, under the influence of gravity.

A vehicle such as the 12 may include one or more seat assemblies 20 constructed in accordance with the present invention. The drawings illustrate one such seat assembly 20, incorporating the energy absorber 10 as described below. Seat assemblies 20 of other dimensions and configurations are possible, of course, within the scope of the invention.

The seat assembly 20 (FIG. 4) includes a seat 22. The seat 22 includes a seat frame 30 and a seat pan 40. The seat 22 is a seat for an occupant of the vehicle 12. The seat 22 as shown includes a seat bottom cushion 24 and a seat back 26. The seat bottom cushion 24 supports most if not all of the weight of the vehicle occupant. The seat back 26 may be movable relative to the seat bottom cushion 24, for example, to set the angle of recline, or to fold forward.

The seat frame 30 is a portion of the seat 22 that is fixed for vertical movement with the vehicle structure 28 (frame, body, floor pan, etc.). The seat frame 30 may, in fact, be a portion of the vehicle structure 28, not a separately identifiable structure or device. Likely it is a separate component because of the desirability of assembling certain components of the energy absorber 10 on the seat frame 30. Thus, manufacturing the seat assembly 20 separately from the vehicle structure 28, then attaching the seat frame 30 to the vehicle structure 28, may be the preferred process. Portions of the seat frame 30 that are illustrated in the drawings include left and right side frame members 32 and a back frame member 34. The back frame member 34 is shown in phantom in FIG. 4 to enable viewing of parts of the energy absorber 10 that are located inside the back frame member.

The seat pan 40 is a portion of the seat 22 that supports the seat back 26 and the seat bottom cushion 24 for selective movement relative to the seat frame 30. This relative movement, as described below, enables an energy absorbing capability for the seat assembly 20, to help protect an occupant of the vehicle 12 in the event of sudden vertical movement of the seat 22 relative to the ground surface 14.

The seat pan 40 (FIGS. 2 and 3) can take any one of many different configurations. In the illustrated embodiment, the seat pan 40 includes a plate 42 supported on a U-shaped tubular member 44. The tubular member 44 includes left and right side legs 46 and 48 interconnected by a back leg 50. A left pivot pin 52 on the seat frame 30 supports the forward end portion 54 of the left side leg 46 of the seat pan 40 for pivotal movement relative to the seat frame about a pivot axis 56. The pivot axis 56 extends laterally in the vehicle 12. A right pivot pin 58 on the seat frame 30 supports the forward end portion 60 of the right side leg 48 of the seat pan 40 for pivotal movement relative to the seat frame about the pivot axis 56.

In this manner, the seat pan 40 is supported on the seat frame 30 for pivotal movement. When this pivotal movement occurs, the forward end portion of the seat pan 40 stays in place on the seat frame 30, because of the pivot connection there, while the back end portion of the seat pan including the back leg 50 moves relative to the seat frame. This movement is substantially vertical (when the seat frame 30 is horizontal as normal), because the lever arm provided by the seat pan side legs 46 and 48 is relatively long, as can be seen in FIGS. 5-9.

When the seat 22 is occupied, the occupant's spine, and most of the occupant's weight, are located over a back portion 62 (FIG. 1) of the seat bottom cushion 24. Therefore, when the goal is to help protect the occupant from sudden strong vertical forces, absorbing energy at the back portion 62 of the seat bottom cushion 24 can help substantially. To this end, the energy absorber 10 (described below in detail) is coupled between the back portion of the seat pan 40 (and thus the back portion 62 of the seat bottom cushion 24) and the seat frame 30. As the back portion of the seat pan 40 moves, the energy absorber 10 controls such movement and thus helps to protect the occupant from the effects of sudden strong vertical forces.

The seat assembly 20 preferably includes straps 102 (FIGS. 3, 5 and 6) which extend between the back leg 50 of the seat pan 40 and the back frame member 34 of the seat frame 30. The straps 102 normally prevent the seat pan 40 from pivoting relative to the seat frame 30. Upon the occurrence of an event generating vertical forces of a magnitude that calls for operation of the energy absorber 10, the straps 102 can break, allowing the seat pan 40 to pivot relative to the seat frame 30. The straps 102 are shown unbroken in FIGS. 3 and 5, and broken in FIG. 6, for example.

The energy absorber 10 (FIG. 4) is illustrated as including two independently acting portions 10a and 10b, one on each side of the seat assembly 20. The two portions 10a and 10b are mirror images of each other and act similarly to each other. The structure and operation of the energy absorber 10 are described below with reference to only one of the two portions 10a and 10b; the one described portion is, for simplicity, identified below and in FIGS. 5-9 with the reference numeral 10 rather than with the reference numeral 10a or 10b.

As noted above, the energy absorber 10 (FIGS. 1 and 4-9) includes a mandrel 70, a wire 80, a spring 90, and a wire gripper 100. The mandrel 70 is a device that provides a surface about which the wire 80 can be trained (wrapped) and pulled to deform the wire. The mandrel 70 is fixed for movement with the seat frame 30. In the illustrated embodiment, the mandrel 70 is a cylindrical pin fixed to the back frame member 34 of the seat frame 30.

The energy absorber 10 includes a deformable member that in the illustrated embodiment is formed as the wire 80. The wire 80 is a member that is deformable upon the application of energy to the wire. The deforming of the wire 80 requires a certain amount of energy, and occurs over a period of time, rather than instantaneously. Thus, as the wire 80 is deformed (bent) around the pin 70, for example, energy is absorbed.

In the illustrated embodiment, the wire 80 may be stainless steel or aluminum wire with a diameter in the range of from about 1.5 mm to about 6 mm or more. Any suitable wire 80 can be used that works with the mandrel 70 to absorb energy in an amount as desired. A solid wire 80 (rather than stranded) is preferable. In the illustrated embodiment, the wire 80 wraps approximately one and one half turns about the pin. The wire 80 could be wrapped with more or fewer turns.

The energy absorber 10 includes a biasing member 90, which in the illustrated embodiment is a tension coil spring. Other types of springs 90, and other types of biasing members 90, can be substituted. A first end portion 92 of the spring 90 is fixed to the seat pan 40 at a location near the pivot axis 56. An opposite second end portion 94 of the spring 90 is connected with the wire 80. In this manner, the spring 90 is connected in line in a force-transmitting relationship between the wire 80 and the seat pan 40.

The energy absorber 10 includes a wire gripper, or gripper, 100. The gripper 100 is a device that allows movement of the wire 80 through the gripper in one direction but blocks movement of the wire through the gripper in the opposite direction—similar to a one-way valve (check valve) in a fluid system. Specifically, the gripper 100 allows movement of the wire 80 through the gripper in a direction away from the pin 70 and toward the spring 90 (to the left as viewed in FIGS. 4-9). The gripper 100 blocks movement of the wire 80 through the gripper in the opposite direction, toward the pin 70 and away from the spring 90 (to the right as viewed in FIGS. 4-9). The gripper 100 may be of any suitable construction, such as a rivet gun gripper.

A first portion 82 of the wire 80 is located between the gripper 100 and the pin 70. If the gripper 100 is moved, as described below, in a direction effectively away from the pin 70, the gripper pulls the wire 80 with it, tensioning the length of wire 82 that is between the gripper and the pin, because the wire can not slip through the gripper. In contrast, if the gripper 100 is moved in a direction effectively toward the pin 70, the gripper can slide or otherwise move along the length of wire 80 (the portion 82) that is between the gripper and the pin (the spring 100 will pull the wire through the gripper). A second portion 84 of the wire 80 is located on the opposite side of the pin 70, being maintained in the back frame member 34, and forming a supply of wire that can be pulled across the mandrel during the energy absorption process.

FIG. 1 illustrates schematically the relationship of the parts of the energy absorber 10. The seat frame 30 is fixed to the vehicle structure 28, for example, the vehicle floor pan. Thus, the seat frame 30 moves up and down, relative to the ground surface 14, when the vehicle structure 28 does. The pin 70 is fixed to the seat frame 30 for movement with the seat frame. The seat 22, on which the vehicle occupant is seated, is fixedly mounted on the seat pan 40. The seat pan 40 is pivotally mounted to the seat frame 30 so that the back end of the seat pan can move up and down relative to the seat frame. The gripper 100 is fixed to the seat pan 40 for movement with the seat pan.

Figure 5:
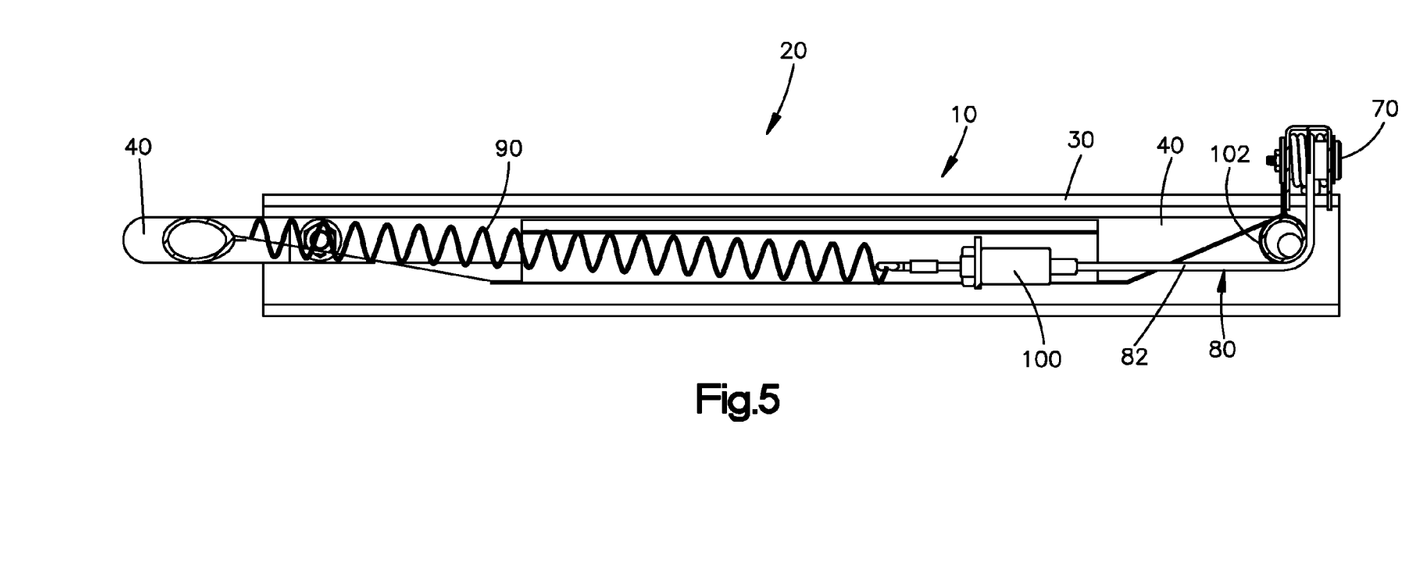
FIGS. 5-9 are a series of side elevational views showing parts of the energy absorber in sequential positions of operation.
Figure 6:
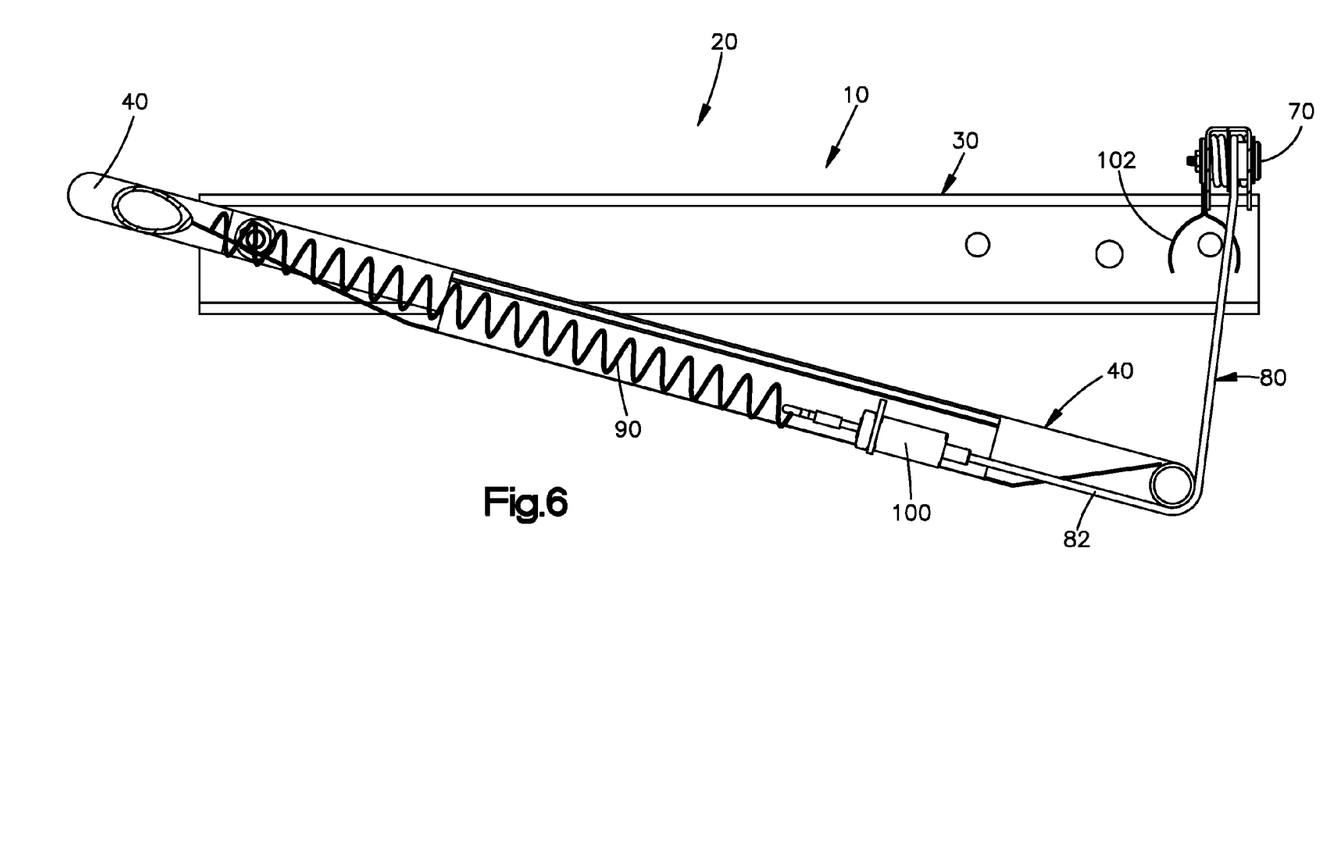

When the vehicle structure 28 is suddenly lifted, as by a mine blast for example, the seat frame 30 is also suddenly lifted, moving upward as a whole. (FIG. 5 depicts the seat pan 40 and seat frame 30 in an initial position, prior to this occurrence. FIG. 6 depicts the seat pan 40 and seat frame 30 in a position after this occurrence.) This upward movement of the seat frame 30 can push the vehicle occupant upward, quickly. This rapid acceleration can put a severe stress on the vehicle occupant. The energy absorber 10 helps to limit that stress by causing that acceleration to occur over an extended period of time, thus cushioning the blow.

Specifically, the upward movement of the seat frame 30 immediately lifts the forward end portion 54 of the seat pan 40, because of the pivot pin connection there. At the back end of the seat frame 30, the upward movement of the seat frame back member 34 applies force to the straps 102. The straps 102 rupture, and the seat frame back member 34 moves upward, but the back leg 50 of the seat pan 40, which is not fixedly mounted to the seat frame 30, stays behind, effectively dropping down relative to the seat frame.

Because the gripper 100 is fixed for movement with the seat pan 40, the effective downward pivoting movement of the seat pan causes the gripper to move, also. The gripper 100 moves relative to the seat frame 30. This movement causes the gripper 100 to pull the wire 80 relative to the seat frame 30 and, thus, relative to the pin 70.

The wire 80 is pulled around the pin 70. As this occurs, the wire 80 plastically deforms. This deformation (wire bending) of the wire 80 effectively acts as an energy absorber, damping and thus cushioning the motion of the seat pan 40 (and thus the vehicle occupant) relative to the seat frame 30 and the vehicle structure 28. The full range of movement of the seat pan 40 relative to the seat frame 30 does occur; and the vehicle occupant is accelerated to the same upward speed as the vehicle structure 28; but these events occur over an extended period of time, which cushions the blow and helps to protect the vehicle occupant. Various aspects of the seat assembly 20 including the energy absorber 10 are tailored to provide the optimal time and amount of energy absorption-the amount of pivoting movement of the seat pan 40, the material and thickness and stiffness of the wire 80, the rupture point of the straps 102, etc.

After the vehicle 12 is lifted off the ground surface 14 as described above, it will thereafter drop down, in the direction 18, onto the ground surface, under the influence of gravity. It is desirable that the energy absorber 10 be able to function again to help protect the occupant during this second event, in which the vehicle 12 and the seat frame 30 suddenly stop but the seat 22 (and its occupant) want to continue moving down. To enable this functionality, all the parts of the energy absorber 10, including the wire 80, the wire gripper 100, and the spring 90 come into play.

Specifically, during the process described above, when the gripper 100 pulls the wire 80 over the pin 70, the length of the wire portion 82 between the gripper 100 and the pin 70 increases because the gripper is moving away from the pin. When the vehicle 12 thereafter rises above the ground surface 14 after the initial blast and ceases its upward acceleration, the seat pan 40, which was "down" relative to the seat frame 30 and the vehicle structure 28, rebounds upward relative to the seat frame 30 because of the lack of gravitational force during free fall. The seat pan 40 "resets" to its initial position relative to the seat frame 30 and the vehicle 12.

Figure 7:
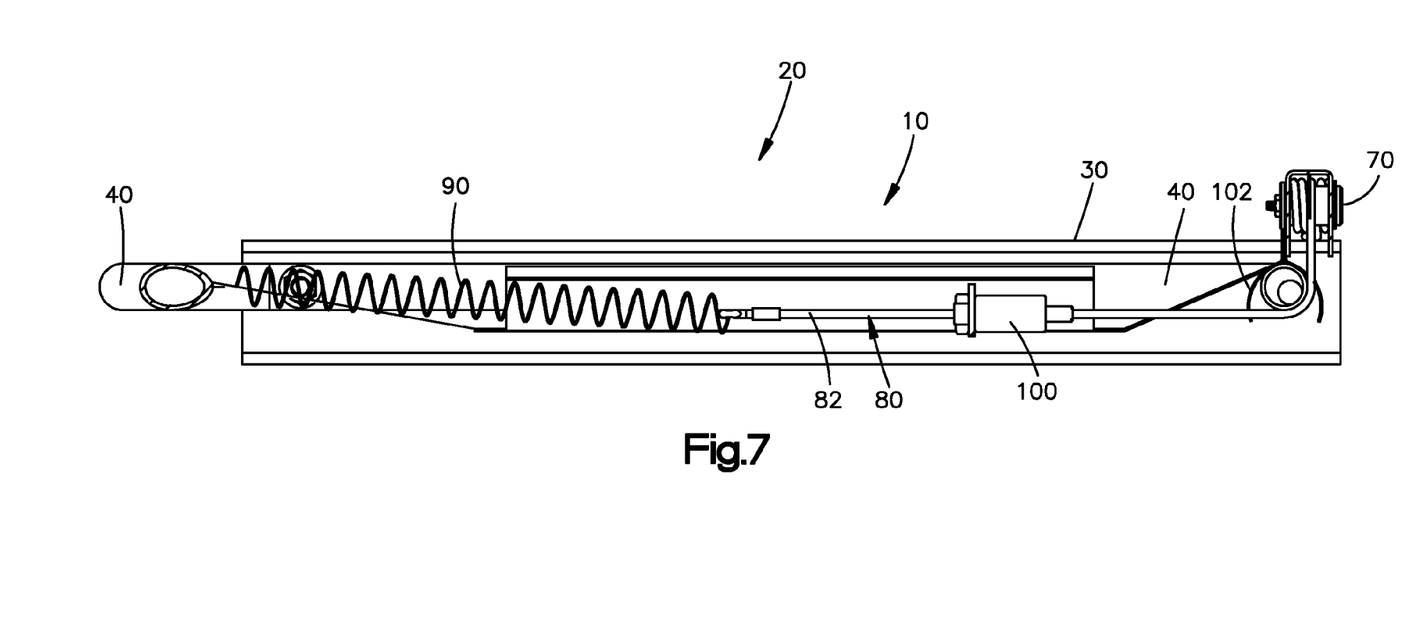

As this resetting movement of the seat pan 40 occurs, the gripper 100 moves closer to the pin 70 (compare FIG. 6 and FIG. 7). Closing this distance could put some slack (not shown) into the portion 82 of the wire 80 that is located between the gripper 100 and the pin 70. If such slack were present, the energy absorber 10 would not thereafter be in a condition to function again, because the gripper 100 would not be able to tension the wire portion 82 and thus not be able to pull and deform the wire 80 over the pin as desired.

The spring 90 and the gripper 100 cooperate to prevent slack from forming in the wire portion 82. Specifically, the spring 90 is always tensioned between the seat pan 40 and the wire 80, and thus always pulls on the wire portion 82. In addition, the construction of the gripper 100 allows the wire 80 to be pulled through the gripper, toward the seat pan 40 (to the left as viewed in FIGS. 4-9). Therefore, when the seat pan 40 resets and the gripper 100 moves toward the pin 70 (FIG. 7), the spring 90 pulls the wire 80 through the gripper (in a direction to the left as viewed in FIGS. 4-9) and prevents slack from forming in the wire. As a result, the wire 80 is reset and remains taut between the gripper 100 and the pin 70. The spring 90 shortens by an amount equal to the length of wire 80 that is pulled around the pin 70. FIG. 7 depicts the seat pan 40, seat frame 30, and energy absorber 10 in a position after this occurrence. The energy absorber 10 is reset. (It should be noted that the energy absorber can reset in any position; the seat pan does not have to return completely to its initial position.)

Figure 8:
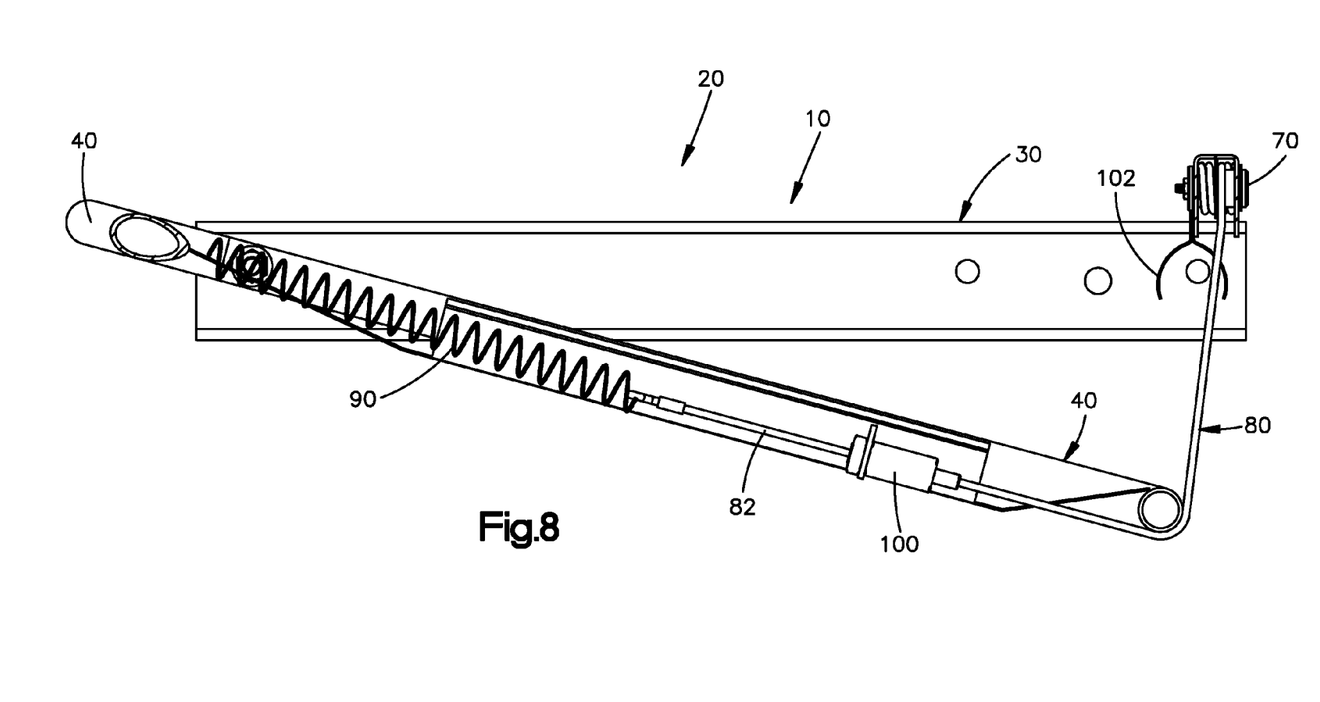
Figure 9:
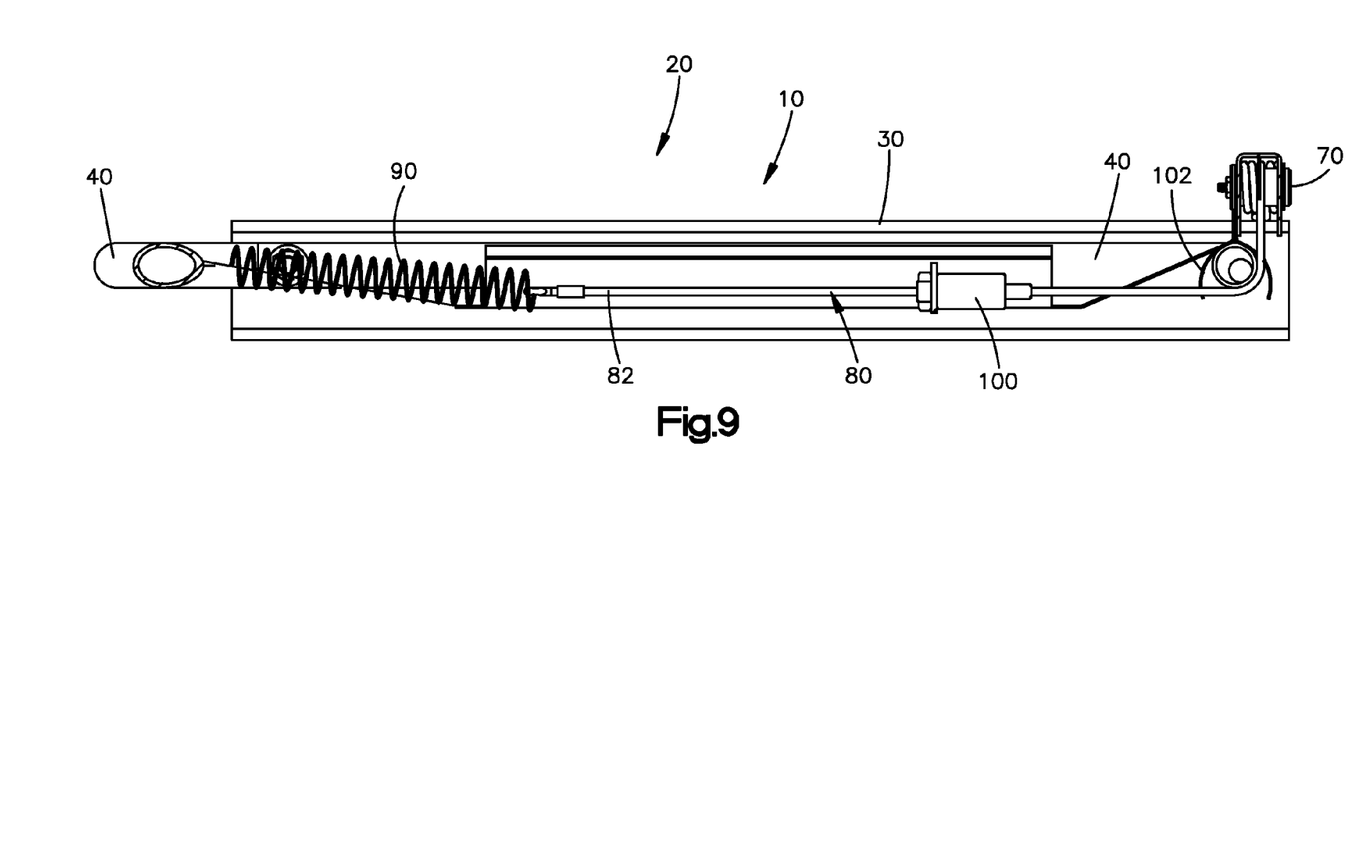

When the vehicle 12 thereafter drops back to the ground surface 14, the relative movement between the seat frame 30 and the back end of the seat pan 40 is the same as in the initial event, and the energy absorber 10 can function in the same manner. FIGS. 8 and 9 show the seat pan 40, seat frame 30, and energy absorber 10 in positions during such a second cycle of energy absorption. If a sufficient length (supply) of wire 80 is provided, the energy absorber 10 can cycle yet again as needed.

The energy absorber 10 works by causing material deformation (in the illustrated embodiment, the metal wire 80), rather than by storing energy. A stored energy system, such as a spring, must at some point release the stored energy. This could cause an associated seat to move back and forth undesirably, for example. In contrast, in the present invention, the energy absorption process is completed when the material is deformed.

The deforming-wire nature of the energy absorber 10 is advantageous as being simple, durable, and strong. The energy absorber 10, because of this construction, is able to endure years of inaction in harsh environments, with zero maintenance or care, and then function immediately when called upon. Also, the energy absorber 10 is simple and strong and can thus withstand the sudden and huge force of a mine blast, which is huge compared to forces experienced in ordinary vehicle usage, such as road forces. More complex systems, such as hydraulic valved shock absorbers, could more easily fail in such circumstances.

The energy absorber 10 is actuated, deforming the wire 80, when the seat assembly 20 strokes (relative movement between the seat pan 40 and the seat frame 30). The seat assembly 20 then resets, and is thus in a condition to stroke again. At this point, the energy absorber 10 is available to function again, during the next stroke of the seat assembly 20, and over the full range of the next seat stroke.

Thus a significant advantage of the present invention is that the seat assembly resets after an energy absorbing event. This resetting movement occurs as described above when the seat pan 40 returns to its starting position (FIG. 5) after having moved away from that starting position to the stroked position shown in FIG. 6 during the initial mine blast. A certain amount of space (distance) is required to accommodate this energy absorption cycle for example. Because the seat assembly 20 does reset, the next energy absorption cycle can be accommodated in (using) the same stroke space of the seat. As an example, the first energy absorbing stroke may have required six inches of stroke space. If the seat assembly 20 would not reset, a second energy absorbing stroke would require an additional six inches of stroke space, for a total of twelve inches, an amount of space that is likely not available in a vehicle. With the present invention, in contrast, the seat assembly 20 resets and so the original six inches of stroke space is available for reuse, to provide the benefit of a twelve inch stroke space.

The invention claimed is:

1. Apparatus comprising:
   a seat frame;
   a seat pan supported on the seat frame for pivotal movement relative to the seat frame in a first direction and in a second direction opposite the first direction; and
   an energy absorber coupled between the seat pan and the seat frame, the energy absorber including:
      a wire gripper fixed for movement with the seat pan;
      a mandrel fixed for movement with the seat frame;
      a deformable wire wrapped around the mandrel and extending through the wire gripper and being movable in a single direction only around the mandrel and through the gripper, and
      a spring connected between the wire and the seat pan and pulling on the wire in the single direction of movement of the wire;
   pivotal movement of the seat pan relative to the seat frame in the first direction moving the gripper in a direction that causes the gripper to pull the wire across the mandrel to deform the wire and absorb energy, without the wire moving through the gripper in either direction;
   the seat resetting by pivotal movement of the seat pan relative to the seat frame in the second direction; and
   the spring pulling the wire through the gripper in the single direction of movement of the wire during the resetting movement of the seat.

2. Apparatus as set forth in claim 1 wherein the seat frame has first and second ends, the seat pan has first and second ends, the first end of seat pan is pivotally mounted to the first end of the seat frame, the second end of seat pan is adjacent the second end of the seat frame and moves away from and toward the second end of seat frame during the pivoting movement of the seat pan relative to the seat frame.

3. Apparatus as set forth in claim 2 wherein the mandrel is located on the second end of the seat frame, and further including a wire supply located on the second end of the seat frame.

4. Apparatus as set forth in claim 2 wherein the single direction of movement of the wire is in a direction generally from the second end of the seat pan toward the first end.

5. Apparatus as set forth in claim 1 wherein the spring has a first end connected with the first end of the seat and a second end connected with the wire, the wire extending from the spring through the gripper and to and over the mandrel.

6. Apparatus as set forth in claim 1 wherein the second end of the seat pan, which moves up and down relative to the second end of the seat frame, is located at the back of the seat frame and thus under the spine of an occupant of the seat so as to absorb energy under the occupant's spine.

7. Apparatus as set forth in claim 1 wherein the seat frame has first and second ends, the seat pan has first and second ends, the first end of seat pan is pivotally mounted to the first end of the seat frame, the second end of seat pan is adjacent the second end of the seat frame and moves away from and toward the second end of seat frame during the pivoting movement of the seat pan relative to the seat frame;

the mandrel is located on the second end of the seat frame, and further including a wire supply located on the second end of the seat frame;

the spring has a first end connected with the first end of the seat and a second end connected with the wire, the wire extending from the spring through the gripper and to and over the mandrel; and the second end of the seat pan, which moves up and down relative to the second end of the seat frame, is located at the back of the seat frame and thus under the spine of an occupant of the seat so as to absorb energy under the occupant's spine.

8. A method of protecting an occupant of a vehicle seat in response to the sudden application of force to the seat, the method including the steps of:

moving a seat pan pivotally relative to a seat frame in a first direction in response to the application of force;

absorbing energy a first time during the pivotal movement of the first and second seat portions in the first direction;

resetting the first and second seat portions by moving them in a second direction opposite the first direction; and absorbing energy a second time upon subsequent relative movement of the first and second seat portions in the first direction of pivotal movement;

wherein the step of absorbing energy a first time includes pulling a wire over a mandrel with a gripper that moves because of the pivotal movement in the first direction, thereby deforming the wire over the mandrel, while blocking movement of the wire through the gripper;

wherein the resetting step includes the step of pulling the wire through the gripper in a direction away from the mandrel; and wherein the step of absorbing energy a second time includes the step of pulling the wire further over the mandrel with the gripper.

9. A method as set forth in claim 8 wherein the seat frame has first and second ends, the seat pan has first and second ends, the first end of seat pan is pivotally mounted to the first end of the seat frame, and the second end of seat pan is adjacent the second end of the seat frame; and the step of moving a seat pan pivotally relative to a seat frame in a first direction in response to the application of force includes moving the second end of the seat pan away from the second end of seat frame.

* * * * *